United States Patent
Li et al.

(10) Patent No.: US 11,611,498 B2
(45) Date of Patent: Mar. 21, 2023

(54) ROUND-TRIP TIME EVALUATION SYSTEM, METHOD, AND APPARATUS

(71) Applicant: Huawei Technologies Co., Ltd., Shenzhen (CN)

(72) Inventors: Tong Li, Dongguan (CN); Kai Zheng, Beijing (CN); Shengjun Chen, Shenzhen (CN); Junsen Chen, Shenzhen (CN); Fanzhao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/199,773

(22) Filed: Mar. 12, 2021

(65) Prior Publication Data
US 2021/0203578 A1 Jul. 1, 2021

Related U.S. Application Data

(63) Continuation of application No. PCT/CN2020/101547, filed on Jul. 13, 2020.

(30) Foreign Application Priority Data
Jul. 12, 2019 (CN) .................. 201910631286.6

(51) Int. Cl.
*H04L 43/0864* (2022.01)
*H04L 1/18* (2006.01)
(Continued)

(52) U.S. Cl.
CPC ........ *H04L 43/0864* (2013.01); *H04L 1/1896* (2013.01); *H04L 43/04* (2013.01); *H04L 43/0858* (2013.01); *H04L 43/106* (2013.01)

(58) Field of Classification Search
CPC .............. H04L 43/0864; H04L 1/1896; H04L 43/04; H04L 43/0858; H04L 43/106
See application file for complete search history.

(56) References Cited

U.S. PATENT DOCUMENTS 7,123,616 B2 10/2006 Weissberger et al.
9,787,461 B1 * 10/2017 Zigelboim ............ H04L 7/0004
(Continued)

FOREIGN PATENT DOCUMENTS

CN 101232717 A 7/2008
CN 101510849 A 8/2009
(Continued)

OTHER PUBLICATIONS

Cardwell, N., et al., "BBR: Congestion-Based Congestion Control, Measuring bottleneck bandwidth and round-trip propagation time," vol. 14, issue 5, Dec. 1, 2016, ACM Queue, 34 pages.
(Continued)

*Primary Examiner* — Dhairya A Patel
*Assistant Examiner* — Eui H Kim
(74) *Attorney, Agent, or Firm* — Conley Rose, P.C.

(57) ABSTRACT

A round-trip time (RTT) evaluation system includes sending, by a first device, a plurality of packets to a second device on a path, where each of the packets carries a timestamp indicating a sending time of a corresponding packet, determining, by the second device based on a statistical value of one-way delays (OWDs) of the packets, timestamps carried in the packets, sending, by the second device, an acknowledgements (ACKs) to the first device, where the ACKs include the timestamps and ACK time information, and determining, by the first device, measurement values of an RTT of the path based on the timestamps, the ACK time information, and times when the ACKs are received.

18 Claims, 4 Drawing Sheets

(51) Int. Cl.
  *H04L 43/04*    (2022.01)
  *H04L 43/0852*  (2022.01)
  *H04L 43/106*   (2022.01)
  *H04L 1/1867*   (2023.01)

(56) References Cited

U.S. PATENT DOCUMENTS

| | | | |
|---|---|---|---|
| 10,742,555 B1* | 8/2020 | Shalev | H04L 47/283 |
| 2004/0105392 A1* | 6/2004 | Charcranoon | H04L 41/5003 |
| | | | 370/252 |
| 2006/0215574 A1* | 9/2006 | Padmanabhan | H04L 43/10 |
| | | | 370/468 |
| 2008/0219164 A1* | 9/2008 | Shimonishi | H04L 47/10 |
| | | | 370/468 |
| 2013/0114421 A1 | 5/2013 | Qian et al. | |
| 2015/0117250 A1 | 4/2015 | Hwang et al. | |
| 2016/0105353 A1 | 4/2016 | Cociglio | |
| 2017/0244623 A1 | 8/2017 | Cocigilo | |
| 2017/0353372 A1 | 12/2017 | Suzuki et al. | |
| 2018/0152281 A1 | 5/2018 | Zigelboim et al. | |
| 2018/0295555 A1 | 10/2018 | Xiong et al. | |

FOREIGN PATENT DOCUMENTS

| | | |
|---|---|---|
| CN | 1706135 B | 9/2010 |
| CN | 102185673 A | 9/2011 |
| CN | 104601393 A | 5/2015 |
| CN | 104618922 A | 5/2015 |
| CN | 105359461 A | 2/2016 |
| CN | 105471757 A | 4/2016 |
| CN | 105830393 A | 8/2016 |
| CN | 106656642 A | 5/2017 |
| CN | 106878191 A | 6/2017 |
| CN | 106936661 A | 7/2017 |
| CN | 108173718 A | 6/2018 |
| CN | 108737207 A | 11/2018 |
| CN | 108833207 A | 11/2018 |
| EP | 2627040 A1 | 8/2013 |
| JP | 2002374302 A | 12/2002 |
| JP | 2006340081 A | 12/2006 |
| WO | 2018096548 A1 | 5/2018 |

OTHER PUBLICATIONS

Iyengar, J., et al., "QUIC Loss Detection and Congestion Control," draft-ietf-quic-recovery-22., Jul. 9, 2019, 42 pages.

Salameh, L., et al., "HACK: Hierarchical ACKs for Efficient Wireless Medium Utilization," The Proceedings of USENIX ATC 14: 2014 USENIX Annual Technical Conference, Jun. 19-20, 2014, Philadelphia, PA, 13 pages.

Braden, R., "Requirements for Internet Hosts—Communication Layers," RFC 1122, Oct. 1989, 116 pages.

Almes, G., et al., "A Round-trip Delay Metric for IPPM," RFC 2681, Sep. 1999, 20 pages.

Shalunov, S., et al., "Low Extra Delay Background Transport (LEDBAT)," RFC 6817, Dec. 2012, 25 pages.

Almes, G., "A One-Way Delay Metric for IP Performance Metrics (IPPM)," RFC 7679, Jan. 2016, 27 pages.

Li, T., et al., "TACK: Improving Wireless Transport Performance by Taming Acknowledgments," SIGCOMM 20, Aug. 10-14, 2020, Virtual Event, NY, USA, 16 pages.

Aggarwal, A., et al., "Understanding the Performance of TCP Pacing," IEEE Infocom, 2000, 9 pages.

* cited by examiner

ROUND-TRIP TIME EVALUATION SYSTEM, METHOD, AND APPARATUS

CROSS-REFERENCE TO RELATED APPLICATIONS

This application is a continuation of International Patent Application No. PCT/CN2020/101547 filed on Jul. 13, 2020, which claims priority to Chinese Patent Application No. 201910631286.6 filed on Jul. 12, 2019. The disclosures of the aforementioned applications are hereby incorporated by reference in their entireties.

TECHNICAL FIELD

This application relates to the field of communications technologies, and in particular, to a round-trip time (RTT) evaluation system, method, and apparatus.

BACKGROUND

The rise of virtual reality (VR), augmented reality (AR), high-definition wireless projection, and artificial intelligence-based new-type applications brings forth a demand for massive data transmission on a wide area network (WAN) and a wireless local area network (WLAN). A requirement on a bandwidth becomes higher. Therefore, data packet transmission requires a high throughput. For example, a $4 \times 10^3$ (K) video requires a throughput of 15 megabits per second (Mbps) to 18 Mbps, and high-definition VR even requires a throughput up to 167 Mbps. However, an existing WLAN transmission capability is far from satisfying a bandwidth requirement of a high-definition video application. For example, an average value of transmission capabilities of global mobile networks in 2017 is only 8.7 Mbps. Although an underlying technology is constantly being innovated, a transport layer protocol is not friendly to a data path layer protocol. As a result, even if a bandwidth reaches 600 Mbps, bandwidth utilization may be only 61%.

However, the "high throughput" poses a new challenge to an acknowledgement (ACK) mechanism. For example, in the Institute of Electrical and Electronics Engineers (IEEE) 802.11, a media access control (MAC) layer protocol mandates that there is certainly a period of space time before each request of spectrum resources. However, some transport layer protocols, for example, a Transmission Control Protocol (TCP), are symmetric protocols, in which one ACK character is returned every time one or two data packets are sent. This manner is referred to as per-packet ACK. Because the ACK and the data packet consume almost a same amount of spectrum resources, in a high-throughput scenario, an increase in a quantity of data packets transmitted on a forward path (a path from a data sending node to a data receiving node, also referred to as a data path) in a unit time causes an increase in a quantity of ACKs transmitted on a backward path (a path that is from a data receiving node to a data sending node and that is used for transmitting an ACK character, also referred to as a control path) in a unit time. As a result, a throughput of data on the forward path drops sharply. Therefore, reducing frequency at which the ACK is transmitted is effective for improving the bandwidth utilization.

Delayed ACK is a most common method for reducing the frequency at which the ACK is transmitted. As a feedback manner in the transmission control protocol, the delayed ACK is a feedback manner in which after one data packet arrives at a receiving node (that is, the foregoing data receiving node) from a sending node (that is, the foregoing data sending node), the receiving node does not return one ACK immediately, but instead, returns one ACK after more data packets arrive or after a segment of time.

An RTT is a total time span from a time at which a data packet is sent from a sending node to a time at which an ACK corresponding to the data packet is received by the sending node, where the ACK is sent after the data packet arrives at a receiving node. Because real-time transmission performance of a network fluctuates, RTT values obtained by the sending node at different times also fluctuate. Therefore, both a measurement value of the RTT in an actual service and a statistical value calculated based on a plurality of RTT measurement values (or an RTT statistical value) may be used as key parameters for evaluating connection transmission performance. Many transmission control policies need to be formulated or adjusted based on the RTT or the RTT statistical value. The RTT statistical value may be a minimum RTT (minRTT), that is, the minimum value in a plurality of RTTs obtained by the data sending node, a maximum RTT (maxRTT), that is, the largest value in a plurality of RTTs received by the data sending node, an average RTT, that is, an average value of a plurality of RTTs received by the data sending node, where the average RTT may be calculated in a plurality of ways, a $K^{th}$ largest RTT in a plurality of RTTs, an RTT that is in a plurality of RTTs of which L % (0<L<100%) is less than or equal to a value of the RTT, for example, an RTT that is in the plurality of RTTs of which 95% is less than or equal to a value of the RTT (95th percentile RTT ($95^{th}$ RTT)), or the like. In some manners, the plurality of RTT measurement values used for calculating the RTT statistical value are values obtained within one time segment. For example, the time segment may be a historical time segment whose duration is a preset length (for example, 5 seconds (s), 10 s, or 13 s), where an endpoint of the historical time segment may be a current moment.

However, in a delayed ACK scenario, calculation of the RTT can rely only on a small quantity of ACKs for sampling. In this sampling manner, it is difficult to ensure accuracy and availability of RTT evaluation with an existing method, and improvement of data transmission performance is also restricted.

SUMMARY

This application provides an RTT evaluation system, method, and apparatus. A timestamp carried in an ACK is screened out by using a one-way delay (OWD), to assist in evaluating an RTT, thereby improving accuracy and availability of RTT evaluation.

According to a first aspect, an embodiment of this application provides an RTT evaluation system. The system includes a first device and a second device. The first device is configured to send a plurality of packets to the second device on a same path, where each of the plurality of packets carries a timestamp indicating a sending time of the packet. The second device is configured to determine, by calculating a statistical value of OWDs of the plurality of packets, a first timestamp in timestamps carried in the plurality of packets, where the first timestamp indicates a sending time of a first packet in the plurality of packets, and a measurement value of an OWD of the first packet is equal to the statistical value of the OWDs of the plurality of packets. The second device is configured to send an ACK to the first device, where the ACK includes the first timestamp and ACK time information, and the ACK time information is related to duration from a time at which the second device receives the first packet to a time at which the second device sends the ACK. The first device is configured to receive the ACK, and determine a measurement value of an RTT of the path based on the first timestamp, the ACK time information, and a second timestamp, where the second timestamp indicates a time at which the first device receives the ACK.

The first device may be considered as a sending device (or a sending node), and the path on which the first device sends the packets to the second device is a forward path. The second device may be considered as a receiving device (or a receiving node), and a path on which the second device sends the ACK to the first device is a backward path. Communication between the first device and the second device may use a multi-path transmission technology, for example, a MultiPath TCP (MPTCP). In this case, an RTT of a subflow is evaluated.

The same path means that the plurality of sent packets use a same route. In a multi-path scenario, the same path means that the packets are on a same subflow.

The plurality of packets may be received by the second device within a first time window. In this case, the statistical value of the OWDs of the plurality of packets is a statistical value of an OWD of the path within the first time window. The packets sent by the first device may be data packets or control packets.

Because the packet sent by the first device carries a timestamp indicating the sending time of the packet, the second device can calculate the OWD of the path. Because the second device may return the ACK after receiving a plurality of packets, the second device determines, by using the statistical value of the OWDs, a timestamp indicating a sending time of a packet carried in the ACK, and also carries, in the ACK, information that corresponds to the packet and that can indicate an ACK sending delay. That is, an RTT is evaluated by analyzing an OWD. In this way, accuracy of RTT evaluation can be improved through cooperation between the first device and the second device. Data transmission on the path is controlled based on an RTT that is more accurate and that can more truly reflect an actual network condition, so that transmission performance of the path is improved.

That the ACK time information is related to duration from a time at which the second device receives the first packet to a time at which the second device sends the ACK means that the duration from the time at which the second device receives the first packet to the time at which the second device sends the ACK can be determined or reflected based on the ACK time information. Therefore, the ACK time information may be expressed in a plurality of manners. In an implementation, the ACK time information includes a third timestamp and a fourth timestamp, where the third timestamp indicates the time at which the second device receives the first packet, and the fourth timestamp indicates the time at which the second device sends the ACK. In another implementation, the ACK time information includes a first time segment, where the first time segment indicates the duration from the time at which the second device receives the first packet to the time at which the second device sends the ACK.

In addition, the first device may calculate the measurement value of the RTT in a plurality of manners. For example, in an implementation, the first device is configured to subtract both the time indicated by the first timestamp and a difference between the fourth timestamp and the third timestamp from the time indicated by the second timestamp, to obtain one measurement value of the RTT of the path. For another example, the first device is configured to subtract both the time indicated by the first timestamp and the first time segment from the time indicated by the second timestamp, to obtain one measurement value of the RTT of the path. For still another example, after completing the foregoing subtraction, the first device performs some post-processing, for example, correcting a result according to some formulas, and using a corrected result as one measurement value of the RTT of the path. The post-processing is engineering-based data processing, for example, making data smoother. Because the evaluated RTT is further used in a service scenario such as transmission control or monitoring, the post-processing may occur.

In an implementation, the first device is further configured to calculate a plurality of measurement values of the RTT of the path based on a plurality of ACKs collected within one time window, and calculate a statistical value corresponding to the plurality of measurement values of the RTT of the path. The statistical value can better reflect the transmission performance of the path than the measurement values, because the statistical value is obtained based on a plurality of measurement values obtained within a segment of time, and can reduce an impact of a subtle change in a network on the RTT evaluation. Because the plurality of measurement values relatively truly reflect an actual condition and are relatively accurate, the statistical value obtained based on the plurality of measurement values can also relatively accurately reflect actual transmission performance of the path.

For example, the time window may be duration starting from the time at which the first device receives the ACK. The plurality of ACKs also need to correspond to the packets transmitted on the same path.

In an implementation, a type of the statistical value of the OWDs of the plurality of packets is the same as a type of the statistical value of the RTT of the path, where the type is one of a maximum value, a minimum value, and an average value. Certainly, these types may comply with different calculation formulas. For example, there are more subdivided types of the average value. On the other hand, the type may alternatively be another statistical value, for example, a $K^{th}$ largest RTT (OWD) in a plurality of RTTs (OWDs), or an RTT (OWD) that is in a plurality of RTTs (OWDs) of which L % (0<L<100%) is less than or equal to a value of the RTT. Certainly, in another implementation, a type of the statistical value of the OWDs of the plurality of packets may alternatively be different from a type of the statistical value of the RTT of the path, and may be determined based on a user requirement.

For example, in a scenario, the statistical value of the OWDs of the plurality of packets is a minimum OWD in the OWDs of the plurality of packets, and the statistical value of the RTT of the path is a minimum RTT in the plurality of measurement values.

In conclusion, according to the foregoing method, dependence of accuracy of RTT estimation on a per-packet ACK mechanism is reduced. In this case, RTT statistics can still be relatively accurately collected or the RTT can still be relatively accurately measured, and many RTT-based transmission control algorithms such as congestion control can play a better role, thereby improving transmission efficiency.

According to a second aspect, this application provides an RTT evaluation method. The method includes that a second device receives a plurality of packets from a first device on a same path, where each of the plurality of packets carries a timestamp indicating a sending time of the packet. The second device determines, by calculating a statistical value of OWDs of the plurality of packets, a first timestamp in timestamps carried in the plurality of packets, where the first timestamp indicates a sending time of a first packet in the plurality of packets, and a measurement value of an OWD of the first packet is equal to the statistical value of the OWDs of the plurality of packets. The second device sends an ACK to the first device, so that the first device evaluates an RTT of the path based on the ACK, where the ACK includes the first timestamp and ACK time information, and the ACK time information is related to duration from a time at which the second device receives the first packet to a time at which the second device sends the ACK.

In the second aspect, the method performed by the second device is described, and the method corresponds to the system described in the first aspect. Therefore, for a specific implementation and beneficial effects of the second aspect, refer to descriptions of the first aspect.

According to a third aspect, this application provides an RTT evaluation apparatus. The apparatus includes a receiving module, configured to receive a plurality of packets from a first device on a same path, where each of the plurality of packets carries a timestamp indicating a sending time of the packet, a timestamp determining module, configured to determine, by calculating a statistical value of OWDs of the plurality of packets, a first timestamp in timestamps carried in the plurality of packets, where the first timestamp indicates a sending time of a first packet in the plurality of packets, and a measurement value of an OWD of the first packet is equal to the statistical value of the OWDs of the plurality of packets, and a sending module, configured to send an ACK to the first device, so that the first device evaluates an RTT of the path based on the ACK, where the ACK includes the first timestamp and ACK time information, and the ACK time information is related to duration from a time at which the second device receives the first packet to a time at which the second device sends the ACK.

According to a fourth aspect, this application provides an RTT evaluation apparatus. The apparatus includes a communications interface, a processing circuit, and a storage medium. The storage medium is configured to store a software program. The communications interface is configured to receive a packet from another device or send a packet to another device according to an instruction in the storage medium. The processing circuit is configured to run the instruction in the storage medium to control the communications interface, to implement a procedure performed by the second device in the foregoing aspects.

In the third aspect and the fourth aspect, two implementations of the second device in the system described in the first aspect are described. Therefore, for specific implementations and beneficial effects of the third aspect and the fourth aspect, refer to descriptions of the first aspect.

According to a fifth aspect, this application provides a chip. The chip includes a communications interface and a processing circuit. The processing circuit is configured to control the communications interface to implement a procedure performed by the second device according to any one of the implementations of the first aspect or any one of the implementations of the second aspect.

According to a sixth aspect, an embodiment of this application provides a chip. The chip is connected to a memory, and is configured to read and execute a software program stored in the memory, to implement a procedure performed by the second device according to any one of the implementations of the first aspect or any one of the implementations of the second aspect.

According to a seventh aspect, an embodiment of this application further provides a computer storage medium. The storage medium stores a software program. When the software program is read and executed by one or more processors, a procedure performed by the second device according to any one of the implementations of the first aspect or any one of the implementations of the second aspect may be implemented.

According to an eighth aspect, an embodiment of this application provides a computer program product including an instruction. When the computer program product runs on a computer, the computer is enabled to perform a procedure performed by the second device according to any one of the implementations of the first aspect or any one of the implementations of the second aspect.

It should be understood that technical solutions in the fifth aspect to the eighth aspect in this application are the same as or similar to technical solutions in the first aspect and the second aspect in this application, and beneficial effects achieved by each aspect and a corresponding feasible implementation are similar. Details are not described again.

DESCRIPTION OF EMBODIMENTS

The solutions provided in embodiments of this application may be used in a plurality of communication scenarios such as end-to-end communication, end-cloud communication, and cloud-to-cloud communication. Therefore, a receiving node or a sending node in this application may be a terminal device (or a terminal), for example, a sensor, a mobile phone, a tablet, a notebook computer, a personal computer, a vehicle-mounted terminal, a set-top box, or a television box, or may be a network device, for example, a gateway, an access router, a core router, a front-end router, a load balancer, or a server. For example, in an end-to-end scenario, a mobile phone projects a video clip onto a smart television or projects a video clip onto a display via a television box or a receiver. For another example, if a video call in a specific application is made between two terminal devices, one of the two terminals and a server of the application form an end-cloud scenario to which the method described in this application is applicable.

It should be understood that both the receiving node and the sending node in this application are devices or operating systems running on the devices. For example, the receiving node is a device that is in a connection and that receives data and sends feedback information, or an operating system running on the device, and the sending node is a device that is in a connection and that sends data, or an operating system running on the device. Certainly, the sending node may also send a control packet. A same device may either be a receiving node within one segment of time or a sending node within another segment of time. Alternatively, because a device may be an end node of a plurality of connections, the device may both be a receiving node and a sending node. For example, a mobile phone may be considered as a sending node when the mobile phone uploads a picture to a network disk and the mobile phone may be considered as a receiving node when a user taps a link of a headline on a news website to read an article. For ease of understanding, a sending node and a receiving node that are in one connection are used as an example for description in this application. In subsequent descriptions, the sending node in the embodiments of this application is also referred to as a first node or a first device, and the receiving node in the embodiments of this application is also referred to as a second node or a second device. In other words, the first node or the first device sends a plurality of packets in an RTT evaluation procedure, where the packets may be data packets or control packets, and the second node or the second device sends feedback information, for example, an ACK, a selective ACK (SACK), or a negative ACK (NACK), in an RTT evaluation procedure.

The solutions in this application may be used in all end-to-end protocols supporting delay estimation. These end-to-end protocols may be a TCP, a User Datagram Protocol (UDP), quick UDP Internet Connection (QUIC), a Stream Control Transmission Protocol (SCTP), and the like, and may even be used for a subflow in a multi-path transmission scenario. This is not limited in this application. In this application, packets used for RTT evaluation need to be sent on a same path, that is, forward paths of the packets need to be the same. Packets sent on different paths are not suitable for use in evaluation of one RTT, because routes are different, and network statuses may also be different. The path is a route from a sending node to a receiving node.

Usually, an RTT is equal to a time obtained by subtracting an echo time carried in the ACK from a current time at which a sending node receives an ACK. Because both the current time and the echo time are obtained in actual networking, an RTT value calculated in this way may be used as a measurement value of an RTT of a path, where the path is used for transmitting a data packet responded by the ACK. The echo time is a time at which the data packet responded by the ACK is sent from the sending node, and the current time may be used to indicate a time at which the ACK is received. In other words, the measurement value of the RTT of the path may be obtained based on the receiving time of the ACK (that is, the current time) and the sending time of the data packet (that is, the echo time). A statistical value corresponding to a plurality of RTTs can be obtained after a statistical operation, for example, calculation of a maximum value, a minimum value, or an average value, is performed on measurement values of the plurality of RTTs. In addition, the path is the route from the sending node to the receiving node.

The following briefly describes a method for calculating an RTT statistical value by using calculation of a minimum RTT as an example. There may be a plurality of paths from a sending node to a receiving node, and a path on which a packet is transmitted may change during transmission. Therefore, distortion occurs when a global minimum RTT (that is, a minimum value of all RTTs obtained through estimation) is used for evaluating transmission performance of a path. The minimum RTT calculated in this application is a minimum RTT of one path. In other words, data packets used for calculating the minimum RTT are transmitted from the sending node to the receiving node on a same path. The sending node is located at a first device, or the sending node is a first device, and the receiving node is located at a second device, or the receiving node is a second device. A method in the conventional technology is as follows. The sending node calculates the minimum RTT of the pair of nodes (the sending node and the receiving node) within a specific time window based on the measurement values of the plurality of RTTs through a windowed minimum filter, and uses the minimum RTT as a measurement value of the minimum RTT of the path. The windowed minimum filter is implemented as follows:

$$\text{mimRTT}=\min(RTT_t), \forall t \in [T-W_R, T],$$

where $RTT_t$ represents an RTT measurement value at a moment t, T represents a current moment, and $W_R$ represents a time window, which is usually several seconds (for example, 5 s, 8 s, 10 s, or 14 s).

The solutions in this application may be used in various scenarios in which delay estimation is required to be relatively precise but a receiving node returns a relatively small quantity of ACKs, where "a relatively small quantity" is relative to a case in which a quantity of packets received by the receiving node is equal to a quantity of ACKs sent by the receiving node. For example, the scenarios include delay estimation in a delayed ACK scenario, and even include delay estimation in some per-packet ACK scenarios. For example, some transmission protocols (for example, the TCP or the standard Request for Comments (RFC) 1122) stipulate that an ACK in the TCP cannot be delayed for more than two data packets and a delay cannot exceed a threshold (for example, 500 milliseconds (ms)). Although this case may be understood as the per-packet ACK scenario, the method described in this application is also applicable. Delayed ACK as a feedback mechanism can not only reduce frequency at which an ACK is sent, but also reduce overheads of two communication parties and an intermediate network device.

Figure 1A:
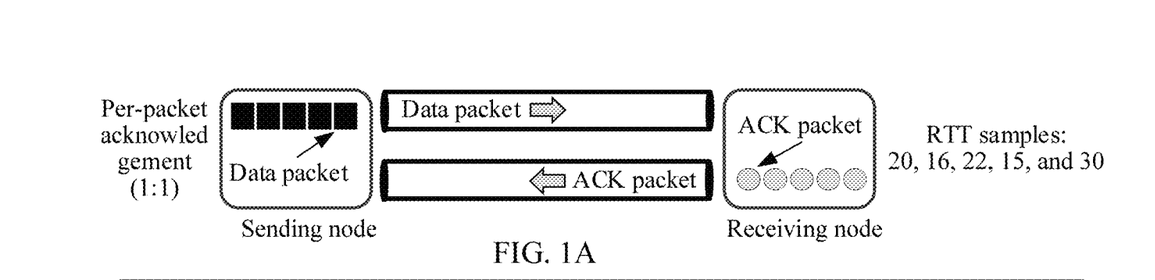
FIGS. 1A, 1B, and 1C are a schematic diagram of returning an ACK in three scenarios according to an embodiment of this application.
Figure 1B:
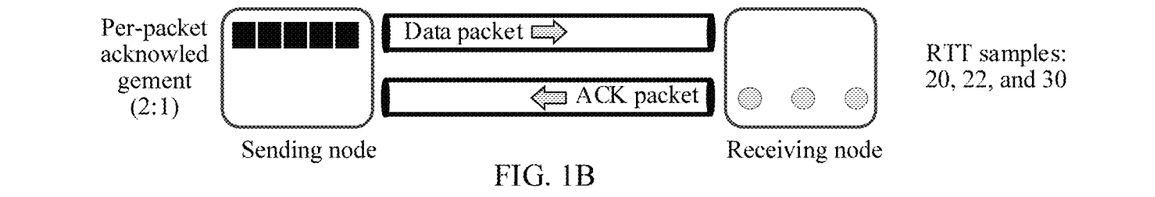
Figure 1C:
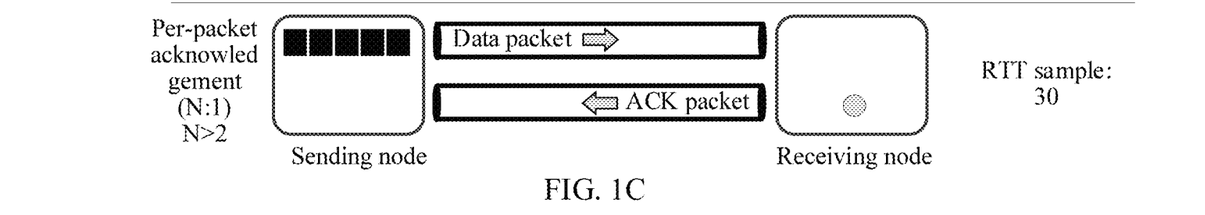

The following describes an impact of a delayed ACK scenario on RTT evaluation and an RTT statistical value with reference to FIG. 1A to FIG. 1C. Further, a minimum RTT is used as an example. In FIG. 1A to FIG. 1C, each black square in a sending node represents one data packet, and each circle in a receiving node represents one ACK. All data packets are transmitted on a same path. FIG. 1A shows that the sending node sends five data packets, and in a per-packet ACK mechanism, the receiving node returns one ACK for each received data packet. A corresponding ratio of a quantity of the data packets to a quantity of the ACKs is (1:1). In this case, the sending node can obtain measurement values of five RTTs, which are 20 ms, 16 ms, 22 ms, 15 ms, and 30 ms. The sending node learns, based on the measurement values of the five RTTs, that the minimum RTT is 15 ms. In a delayed ACK mechanism, it is assumed that one ACK is returned for every two data packets. Because there are only five data packets in FIG. 1A to FIG. 1C, a corresponding ratio of a quantity of the data packets to a quantity of the ACKs in FIG. 1(b) is (5:3). In this case, the sending node can obtain measurement values of three RTTs, which are 20 ms, 22 ms, and 30 ms. The sending node learns, based on a set of the measured RTTs, that the minimum RTT of the path is 20 ms. A deviation of the statistical result from the result in FIG. 1A reaches 30%. For another example, FIG. 1C shows a case in which one ACK is returned for every N (N>2) data packets. A ratio shown in FIG. 1C is (5:1). Assuming N=5, the sending node can obtain only a measured RTT of one data packet, that is, 30 ms. As a result, the minimum RTT of the path obtained in this case is 30 ms. A deviation of the statistical result from the result in FIG. 1A reaches 100%.

It can be learned that when one ACK is returned only after a plurality of data packets are received, an RTT statistical value is easily skewed. Reduction of only a quantity of ACKs causes some problems, for example, (1) generation of a traffic burst due to a change in a sending mode, and disturbance to sending window update and a packet loss detection algorithm, (2) higher sensitivity to an ACK loss, and (3) inability to accurately evaluate an RTT.

It can be learned that RTT measurement depends on the ACK. If a quantity of ACKs is less than a quantity of per-packet ACKs, there is a decreasing probability of obtaining an accurate RTT measurement value and an accurate RTT statistical value by using the existing method. In different cases, results of an RTT measurement value and an RTT statistical value greatly fluctuate, easily resulting in incorrect measurement and statistical results or a deviation of measurement and statistical results from actual results. Therefore, designing a method that better guarantees accurate the RTT measurement and estimation, reduces a fluctuation in the result, and reflects an actual condition as much as possible is of great practical significance for scenarios such as a WLAN and an asymmetric network.

A basic idea of this application is inferring a change in an RTT based on a change in an OWD at a receiving node, fully utilizing a difference in capabilities of the receiving node, reducing dependence of delay estimation on a per-packet ACK mechanism, and performing more precise delay estimation in an indirect manner. The OWD is a time span from a time at which a data packet is sent from a sending node to a time at which the data packet arrives at a receiving node. It should be noted that, for explanations and definitions of an OWD measurement value and an OWD statistical value (for example, a minimum OWD, a maximum OWD, or an average OWD) below, refer to corresponding explanations and definitions of the RTT measurement value and the RTT statistical value. Details are not described below again.

Both the OWD statistical value and the RTT statistical value are statistical values within a segment of time, for example, one time window. In an implementation, a time window of the RTT statistical value is longer than a time window of the OWD statistical value.

In transmission control, an upper-layer service focuses more on a transmitted data packet than on an ACK. For example, when a file is transmitted, user experience is associated with a time used for completing file transmission. Therefore, a user cares only about that a data packet arrives at a receiving node from a sending node as soon as possible, and does not care much about transmission of an ACK of the data packet. Because an OWD is related only to transmission of the data packet, whereas an RTT is related to transmission of both the data packet and the ACK, inference on a change in the RTT based on a change in the OWD in this application is reasonable and feasible.

Based on this, the embodiments of this application provide a data transmission method and an apparatus, to improve accuracy of RTT evaluation, thereby improving data transmission performance. Because the method and the apparatus use similar principles for problem solving, mutual reference may be made between implementation of the apparatus and implementation of the method. Repeated parts are not described in detail again.

In addition, it should be noted that in this application, "at least one" means one or more, and "a plurality of or several" means two or more. The term "and/or" describes an association relationship between associated objects and represents that three relationships may exist. For example, A and/or B may represent the following three cases: only A exists, both A and B exist, and only B exists, where A and B may be singular or plural. The character "/" generally indicates an "or" relationship between the associated objects. The term "at least one of the following items (pieces)" or a similar expression thereof represents any combination of these items, including a single item (piece) or any combination of a plurality of items (pieces). For example, "at least one item (piece) of a, b, or c" may represent a, b, c, a-b, a-c, b-c, or a-b-c, where a, b, and c may be singular or plural. It should be understood that although terms such as "first" and "second" may be used in the embodiments of this application to describe objects, these terms are merely used to distinguish between the objects.

Figure 2:
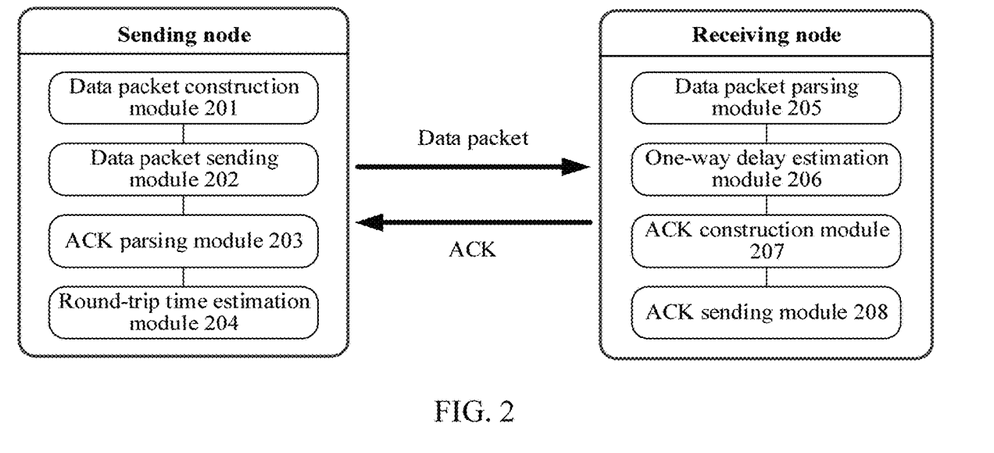
FIG. 2 is a schematic architectural diagram of a communications system according to an embodiment of this application.

FIG. 2 is a specific schematic architectural diagram of an example of a communications system according to an embodiment of this application. The communications system includes a sending node and a receiving node. For example, the sending node includes a data packet construction module 201, a data packet sending module 202, an ACK parsing module 203, and an RTT estimation module 204. On the receiving node, a data packet parsing module 205, an OWD estimation module 206, an ACK construction module 207, and an ACK sending module 208 are implemented. The receiving node may further include a data packet receiving module, which is not shown in FIG. 2. It should be noted that the sending node and the receiving node may further include another module that is not described in this application, and a quantity of modules on the node is not limited in this application. In addition, the architecture in FIG. 2 is merely an example. Modules included respectively in the receiving node and the sending node are not limited in this application. During specific implementation, functions of some of the modules may alternatively be implemented in one module.

The following describes, by using the system in FIG. 2 as an example, the way that an apparatus structure performs the method described in this application. In this example, an example in which the sending node sends a data packet is used for description.

1. The sending node constructs a data packet via the data packet construction module 201, and sends the data packet to the receiving node on a communication path via the data packet sending module 202. The data packet carries a sending timestamp of the data packet.

A sending timestamp of a data packet (or a data packet sending timestamp) indicates a moment at which the data packet is sent from the sending node.

2. The receiving node obtains, via the data packet parsing module 205, the data packet sending timestamp carried in the data packet, and records an arrival timestamp of the data packet.

An arrival timestamp of a data packet (or a data packet arrival timestamp) indicates a moment at which the data packet arrives at the receiving node.

3. The receiving node calculates an OWD of the data packet based on the sending timestamp and arrival timestamp of the data packet via the OWD estimation module 206. In this manner, the receiving node can calculate an OWD of each received data packet.

4. The receiving node analyzes, via the OWD estimation module 206, OWDs of a plurality of data packets received within a segment of time, to obtain an OWD analysis result.

For example, the analysis result may be information about a packet that corresponds to a minimum OWD and that is in the packets received by the receiving node within the segment of time, for example, an identifier of the packet. For another example, the analysis result is whether a fluctuation in the OWDs of the packets received within the segment of time exceeds a threshold.

5. The receiving node constructs an ACK based on the OWD analysis result via the ACK construction module 207. The receiving node sends the ACK to the sending node on the communication path via the ACK sending module 208.

The ACK carries information required by the sending node for calculating an RTT. The information may be a value, used to indicate an OWD measurement value of a specific packet or a statistical value of OWDs within a specific segment of time. Alternatively, the information may be a sending timestamp of the ACK and sending delay duration of the ACK, for example, a time difference between a time at which the data packet is received and a time at which the ACK corresponding to the data packet is sent.

6. The sending node parses the received ACK via the ACK parsing module 203, to obtain the information required by the sending node for calculating the RTT, and outputs the information to the RTT estimation module 204.

7. The sending node obtains, via the RTT estimation module 204, a measurement value of the RTT based on the information output by the ACK parsing module 203 (that is, the information required by the sending node for calculating the RTT).

After the foregoing process is repeatedly performed for a plurality of times, a plurality of measurement values of the RTT can be obtained.

8. The sending node calculates a statistical value of the RTT based on the plurality of measurement values of the RTT via the RTT estimation module 204.

In addition, this application further provides another communications system. The system includes a first device and a second device. The first device is the sending node in the system shown in FIG. 2, and the second device is the receiving node in the system shown in FIG. 2. For further detailed descriptions of how the communications system implements the following procedure, refer to other corresponding paragraphs in this application, for example, descriptions of the method, and refer to the description above.

The first device is configured to send a plurality of packets to the second device on a same path, where each of the plurality of packets carries a timestamp indicating a sending time of the packet. The second device is configured to determine, by calculating a statistical value of OWDs of the plurality of packets, a first timestamp in timestamps carried in the plurality of packets, where the first timestamp indicates a sending time of a first packet in the plurality of packets, and a measurement value of an OWD of the first packet is equal to the statistical value of the OWDs of the plurality of packets. The second device is configured to send an ACK to the first device, where the ACK includes the first timestamp and ACK time information, and the ACK time information is related to duration from a time at which the second device receives the first packet to a time at which the second device sends the ACK. The first device is configured to receive the ACK, and determine a measurement value of an RTT of the path based on the first timestamp, the ACK time information, and a second timestamp, where the second timestamp indicates a time at which the first device receives the ACK. In an implementation, the ACK time information includes a third timestamp and a fourth timestamp, where the third timestamp indicates the time at which the second device receives the first packet, and the fourth timestamp indicates the time at which the second device sends the ACK.

It can be learned that the first device and the second device may not include as many modules as those in the system corresponding to FIG. 2. In other words, there are diversified manners for division into modules in the device or the node.

In an implementation, the ACK time information includes a first time segment, where the first time segment indicates the duration from the time at which the second device receives the first packet to the time at which the second device sends the ACK.

In an implementation, the first device is further configured to calculate a plurality of measurement values of the RTT of the path based on a plurality of ACKs collected within one time window, and calculate a statistical value corresponding to the plurality of measurement values of the RTT of the path.

In an implementation, both a type of the statistical value of the OWDs of the plurality of packets and a type of the statistical value of the RTT of the path are each a maximum value, a minimum value, or an average value.

In this way, the foregoing system can improve accuracy of RTT evaluation by using the OWD.

In the foregoing process, the receiving node (the second device) can obtain the measurement value or the statistical value of the OWD according to a "requirement" of the sending node (the first device). "Based on a requirement" means that the statistical value of the RTT is in a plurality of forms, for example, the minimum RTT, the maximum RTT, the $K^{th}$ largest RTT (0<K<100%), and the average RTT that are mentioned above. The type of the statistical value of the OWD calculated by the receiving node is the same as the type of the statistical value of the RTT calculated by the sending node. For example, if the "requirement" of the sending node is to obtain the minimum RTT, the receiving node correspondingly obtains a minimum OWD. For another example, if the "requirement" of the sending node is to obtain the maximum RTT, the receiving node correspondingly obtains a maximum OWD. The rest may be deduced by analogy. In this way, computing resources can be saved. Certainly, there may alternatively be another implementation in which the statistical value of the OWD and the statistical value of the RTT are of different types. That is, regardless of whether the "requirement" of the sending node is to obtain the minimum RTT, the maximum RTT, the $K^{th}$ largest RTT (0<K<100%), or the average RTT, the receiving node correspondingly obtains only a $K^{th}$ largest OWD (0<K<100%), where corresponding K values are different. For example, a K value corresponding to the minimum RTT is 5%, a K value corresponding to the maximum RTT is 95%, and a K value corresponding to the average RTT is 50%.

The following describes an RTT evaluation method provided in this application. In short, a sending node (or a first node or a first device) sends packets (the packets may be data packets or control packets) to a receiving node (or a second node or a second device) on a same path, and carries, in each packet, a timestamp (that is, a packet sending timestamp) at which the sending node sends the packet. After receiving one or more packets within one time window, the receiving node calculates a statistical value of OWDs of the packets, and carries, in a returned ACK, a timestamp and information (that is, ACK time information) required by the sending node for calculating an RTT, for example, a statistical value used to indicate an OWD measurement value of a specific packet, a statistical value used to indicate an OWD within a specific segment of time (for example, a first time window), or a sending timestamp of the ACK and sending delay duration of the ACK. The timestamp carried in the ACK indicates a sending time of one of the plurality of packets, and a measurement value of an OWD of the packet is equal to the statistical value of the OWDs of the plurality of packets. In this way, the sending node can obtain a more accurate measurement value of an RTT or further calculate a statistical value of an RTT based on the ACK. For example, the sending node calculates, based on a plurality of ACKs received within a second time window, a statistical value of the RTT within the segment of time.

The foregoing process further includes steps in which the receiving node and the sending node calculate a delay or collect statistics on a delay. For example, the receiving node may calculate an OWD measurement value based on a timestamp at which a data packet arrives at the receiving node and a data packet sending timestamp carried in the data packet, and perform specific processing on the OWD measurement value. The receiving node may further calculate an OWD statistical value of a specific type based on the OWD measurement value and based on a requirement of the sending node on an RTT statistical value, to determine a timestamp that is to be carried in an ACK and that indicates a sending time of a packet.

According to the foregoing method, dependence of accuracy of RTT estimation on a per-packet ACK mechanism is reduced. In this case, RTT statistics can still be relatively accurately collected or the RTT can still be relatively accurately measured, and many RTT-based transmission control algorithms such as congestion control can play a better role, thereby improving transmission efficiency.

Next, an implementation of the method in this application is described with reference to FIG. 3A, FIG. 3B, FIG. 4A, FIG. 4B, and FIG. 4C by using evaluation of a minimum RTT as an example. Many transmission control protocols depend on accuracy of the evaluation of the minimum RTT. For example, bottleneck bandwidth and round-trip propagation time (BBR) and Copa are two new congestion control algorithms. Copa is a new algorithm released on the USENIX Networked Systems Design and Implementation (NSDI) 2018, and does not have a corresponding Chinese translation. Efficiency of the algorithms is closely related to accuracy of estimation of the minimum RTT. The BBR is used as an example. In the BBR, a maximum bandwidth and a minimum RTT that are of a network are detected in real time, a bandwidth delay product (BDP) is calculated, and then, a maximum total amount of data that can be sent to the network is determined based on the BDP, to perform congestion control. If a measured minimum RTT is greater than an actual RTT, a total amount of data sent to the network exceeds a capacity of the network, easily causing packet loss and an increased queuing delay, and reducing transmission efficiency.

Figure 3A:
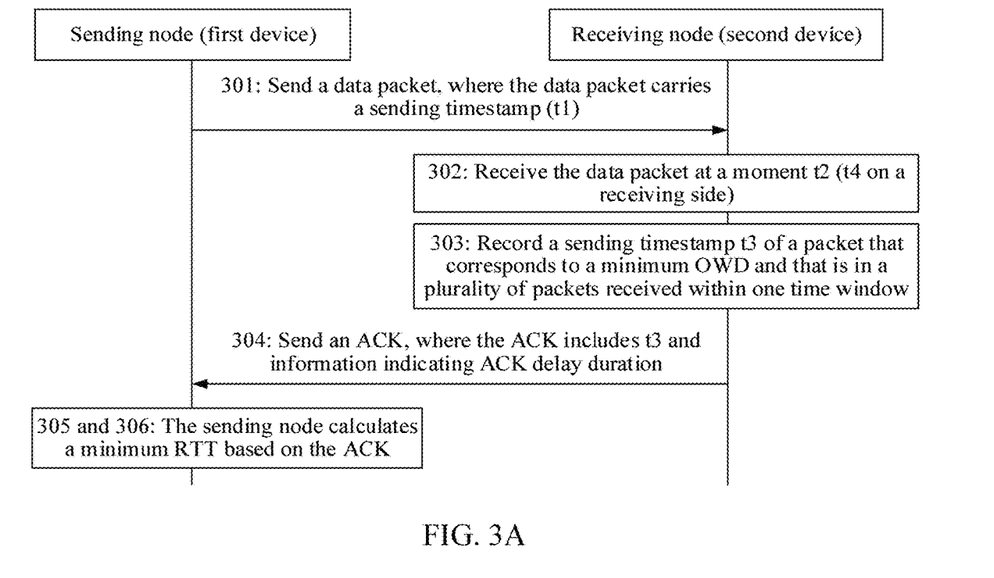
FIG. 3A is a schematic flowchart of RTT evaluation according to an embodiment of this application.

FIG. 3A describes a process of calculating a minimum RTT. The process includes the following steps.

Step 301: At a moment t1, a sending node sends a data packet to a receiving node on a forward path, where the data packet includes a timestamp indicating a send moment (that is, t1).

The timestamp indicating the send moment is a data packet sending timestamp of the data packet.

The sending node may include a plurality of to-be-sent data packets. Data in the to-be-sent data packets may be delivered by an application running on the sending node, is encapsulated by using a protocol stack, and waits to be sent in a sending queue.

Figure 3B:
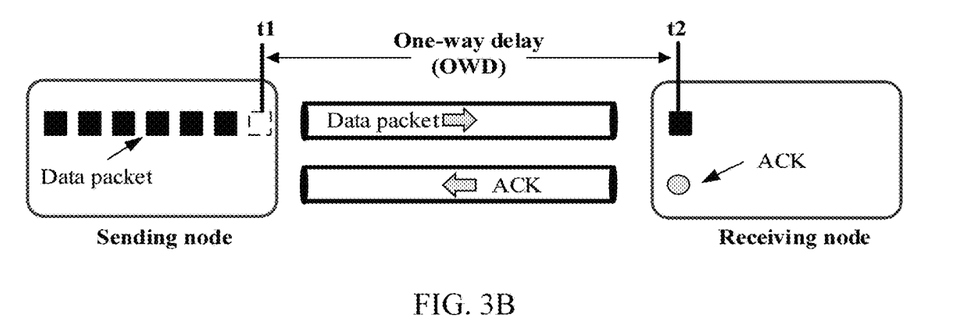
FIG. 3B is an indication diagram of calculating an OWD according to an embodiment of this application.

Step 302: The receiving node receives the data packet at a moment t2, where t2 is a receiving moment of the data packet. In this case, the receiving node may obtain an OWD of the data packet on the forward path based on the receiving moment and the timestamp indicating the sending moment in the data packet. In addition, the receiving node uses the OWD of the data packet as a measurement value of the OWD (OWD=t2−t1), as shown in FIG. 3B. In FIG. 3B, the sending node has a plurality of to-be-sent packets and sends a packet at the moment t1, the packet sent at the moment t1 is received by the receiving node at the moment t2, and the receiving node generates an ACK and sends the ACK to the sending node on a backward path.

In another implementation, the receiving node smoothens the OWD of the data packet by using an exponentially weighted moving average method, to obtain a correspondingly smooth OWD (represented by sOWD), that is, sOWD=a×sOWD+(1−a)×OWD, where a is an adjustable factor, for example, a=0.9. Finally, the receiving node uses the sOWD as the measurement value of the OWD.

Step 303 The receiving node records a sending timestamp of a packet that corresponds to a minimum OWD and that is in a plurality of packets received within one time window.

In the foregoing steps, the measurement value or statistical value of the OWD is calculated to obtain, through evaluation, ACK delay duration that is more accurate and that can more truly reflect an actual condition.

Because the sending node may continuously send data packets, according to a processing manner in step 302, the receiving node may receive a plurality of data packets with timestamps, and obtain a plurality of measurement values of the OWD. Then, the receiving node determines an OWD with a minimum value (or a minimum OWD (minOWD)) within duration of one time window (or a first time window) through a windowed minimum filter. A length of the time window is preset, for example, may be configured based on a requirement, for example, 20 ms.

That is:

$$\text{minOWD}=\text{MIN}(OWD_t), \forall t \in [T-W1, T],$$

where $OWD_t$ represents an OWD measurement value at a moment t, T represents a current moment, a function MIN( ) means to take a minimum value, and W1 represents duration of a first time window, which may be configured based on a requirement, for example, 20 ms.

The receiving node records the sending timestamp of the data packet that corresponds to the minimum OWD. For example, the recorded data packet that corresponds to the minimum OWD happens to be the foregoing data packet described as an example. The sending timestamp of the data packet is t1, and a timestamp at which the data packet arrives at the receiving node is t2. The receiving node may have its own manner of managing these timestamps, for example, setting some parameters to record these timestamps. For example, the receiving node records that t3=t1 and t4=t2.

If the sending node needs to calculate only a measurement value of an RTT, step 303 may not be performed.

Step 304: The receiving node constructs an ACK and sends the constructed ACK to the sending node on a backward path. The ACK includes a data packet sending timestamp and information indicating ACK delay duration.

The information indicating ACK delay duration may be, for example, ACK delay duration, or may be a receiving timestamp of a data packet (a timestamp indicating a time at which the receiving node receives the data packet) and a sending timestamp of an ACK corresponding to the data packet (a timestamp indicating a time at which the receiving node sends the ACK) that are carried in the ACK.

If the sending node needs to calculate only a measurement value of an RTT, the sending timestamp carried in the ACK corresponds to a sending timestamp of any packet. The following uses an example for description in which a sending timestamp of the data packet corresponding to the minimum OWD is carried.

Figure 4A:
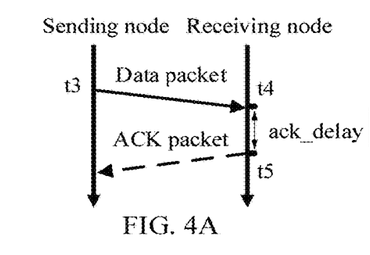
FIGS. 4A, 4B, and 4C are a schematic diagram of a time sequence and a structure for sending an ACK according to an embodiment of this application.
Figure 4B:
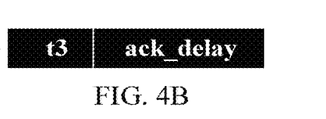
Figure 4C:
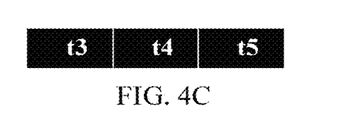

The following describes several implementations of the process with reference to FIG. 4A, FIG. 4B, and FIG. 4C.

FIG. 4A is described from a perspective of the receiving node. A sending timestamp of a data packet corresponding to a minimum OWD is t3, and a timestamp at which the data packet arrives at the receiving node is t4. After receiving the data packet, the receiving node sends an ACK at t5. In this case, for the data packet, ACK delay duration ack_delay=t5−t4. It should be understood that the receiving node may further receive another data packet between t4 and t5.

In an implementation, as shown in FIG. 4B, the ACK constructed by the receiving node includes ack_delay and t3. The two parameters may be in a header, an option field, or a data field of the ACK.

The TCP protocol is used as an example. In an option field in an existing TCP packet, a timestamp option already includes 10 bytes. Two bytes indicate an option type, and the remaining eight bytes include the timestamp t3 (four bytes) and the timestamp t5 (four bytes). Therefore, only the option field in the TCP packet needs to be modified, and a value of t5 is replaced with a value of ack_delay.

In an implementation, as shown in FIG. 4C, the ACK constructed by the receiving node includes t3, t4, and the timestamp t5 at which the ACK is transmitted. The three parameters may be in a header, an option field, or a data field of the ACK.

In this way, after receiving the ACK, the sending node may calculate the ACK delay duration (ack_delay=t5−t4) based on t5 and t4. The TCP is used as an example. In an options field in an existing TCP packet, a timestamp option already includes 10 bytes. Two bytes indicate an option type, and the remaining eight bytes include t3 (four bytes) and t5 (four bytes). Therefore, only the size of the timestamp option in the option field in the TCP packet needs to be modified to 14 bytes. Each of t3, t4, and t5 occupies four bytes. Because t3, t4, and t5 can be distinguished by values (for example, sequentially increasing or sequentially decreasing), an order of the three parameters may not be limited.

Step 305: The sending node calculates a measurement value of the RTT based on the ACK.

The sending node calculates the measurement value of the RTT based on the data packet sending timestamp and the information indicating the ACK sending delay that are in the ACK, and a timestamp t6 at which the ACK arrives at the sending node. That is, one measurement value of the RTT can be obtained based on one ACK. For example, based on the ACK described above, RTT=t6−t3−ack_delay.

In an implementation, after calculating a value of the RTT (for example, RTT=t6−t3−ack_delay) based on the information carried in the ACK and the timestamp at which the ACK arrives at the sending node, the sending node further smoothens the value by using an exponentially weighted moving average method, to obtain a correspondingly smooth RTT (represented by sRTT), that is, sRTT=a×sRTT−(1−a)× RTT, where a is an adjustable factor, for example, a=0.9. The sending node uses the sRTT as the measurement value of the RTT.

Step 306: The sending node calculates a minimum RTT based on a plurality of ACKs received within one time window (that is, a second time window) corresponding to the RTT.

Similar to a manner used by the receiving node in step 303, according to a processing manner in step 305, the sending node may receive the plurality of ACKs and calculate a plurality of measurement values of the RTT, and the sending node filters the plurality of measurement values of the RTT through a windowed minimum filter, to obtain the minimum RTT (represented by minRTT). That is, the following formula is used:

$$\text{minRTT}=\text{MIN}(RTT_t), \forall t \in [T-W2, T],$$

where $RTT_t$ represents an RTT measurement value at a moment t, a function MIN( ) means to take a minimum value, T represents a current moment, and W2 represents duration of the second time window, which may be configured based on a requirement. It can be learned that the second time window may be a segment of time whose duration starts from an earlier moment and ends at the current moment. Usually, W2 is greater than W1. For example, W2=10 s.

After being set, the duration of the first time segment and the duration of the second time segment described above may be updated subsequently.

An RTT is a round-trip time. A main idea in this application is to indirectly evaluate a statistical value of a "round-trip" by using a statistical value of a "sending trip". A minimum OWD corresponds to a "sending trip" part of the RTT, and a "receiving trip" part of the RTT is not evaluated. If a data packet corresponding to the minimum OWD encounters network jitter on a "receiving trip", for example, if congestion on a "return" path is encountered, a measurement value of the RTT is relatively large. If the measurement value is directly used as a value of a minimum RTT, the RTT is incorrect. To avoid the inaccuracy, a minimum value of a plurality of measurement values is calculated at a sending end based on a second time window, mainly to eliminate an error. In other words, although there is an existing method in which the sending end calculates a minimum value of a plurality of RTT measurement values, a function of calculating a minimum value in the method described in this application is slightly different from a function of calculating a minimum value in the existing method. To be specific, the existing method is intended to eliminate both an error that occurs on the "sending trip" and an error that occurs on the "receiving trip", but the method in this embodiment is intended to eliminate the error that occurs on the "receiving trip".

Certainly, the foregoing provides a description by using an example in which each ACK carries information about a data packet corresponding to a minimum OWD. Such estimation performed "based on a requirement" can implement more accurate calculation of a minimum value of the RTT. In another implementation, an ACK may alternatively carry a sending timestamp and a receiving timestamp that are of any data packet corresponding to the ACK. The sending node may also calculate the minimum RTT based on a plurality of ACKs, and can also obtain an RTT statistical value that more truly reflects an actual condition and is more accurate than an RTT statistical value obtained in the conventional technology.

The foregoing process is described by using the minimum RTT as an example, but the description may also be extended to calculation of an RTT statistical value of another type, for example, a maximum RTT, a $K^{th}$ largest RTT in a plurality of RTTs, an RTT that is in a plurality of RTTs of which L % is less than or equal to a value of the RTT, or an average RTT. Correspondingly, if estimation is performed "based on a requirement", only the minimum OWD needs to be accordingly replaced with a maximum OWD, a $K^{th}$ largest OWD in a plurality of OWDs, an OWD that is in a plurality of OWDs of which L % is less than or equal to a value of the OWD, or an average OWD. If estimation is not performed "based on a requirement", estimation is more flexible.

In the conventional technology, a receiving node triggers, only by using a sent ACK, a sending node to record an arrival time of the ACK, and then the sending node obtains a measurement value or statistical value of an RTT based on a sending time that is of a data packet corresponding to the ACK and that is recorded by the sending node. That is, the sending node obtains the measurement value or statistical value of the RTT based on the arrival time that is of the ACK and that is fed back by the receiving node. In an entire process, the receiving node does not do any work for calculating the RTT except for sending a standard ACK. Instead, a manner in which receiving and sending parities cooperate is used in this application.

On the other hand, in the conventional technology, RTT measurement values are directly calculated on the sending node, and a minimum value of the RTT measurement values is used as a minimum RTT. In this application, an indirect manner is used. The receiving node calculates an OWD measurement value and uses the OWD measurement value as a minimum OWD. Then, the sending node calculates an RTT measurement value corresponding to a data packet that corresponds to the minimum OWD. Based on a plurality of RTT measurement values, the sending node then uses a minimum value of the RTT measurement values as a minimum RTT. When a quantity of returned ACKs is less than a quantity of per-packet ACKs, the solutions described in this application can ensure accuracy of evaluation of the minimum RTT.

Furthermore, compared with the conventional technology, in the solutions in this application, this application does not require clock synchronization to be performed between the sending node and the receiving node. A common problem in measurement of an OWD is that clocks on the sending node and the receiving node may not be synchronized. Therefore, to obtain an accurate OWD value, clock synchronization needs to be performed. However, in this application, the receiving node only performs a comparison operation on OWD measurement values, and only a difference between OWDs is used. Therefore, in this application, clock synchronization does not need to be performed, and an actual OWD measurement value does not need to be obtained during evaluation, thereby eliminating an impact of a system error in a measurement system. All OWD values in this application are relative values with a clock synchronization error, and the relative values do not affect effects of this application.

After being adaptively modified, the solutions described in this application may also be used in a case in which the receiving node measures or collects statistics on, based on a data packet from the sending node, a transmission parameter of another receiving node, for example, a bandwidth, jitter, a packet loss rate, or a receiving rate of the receiving node. The receiving rate of the receiving node is an amount of data received by the receiving node in a unit time. After collecting statistics on a specific transmission parameter, the receiving node carries the statistics about the transmission parameter in an ACK and feeds back the ACK to the sending node. In this way, the sending node can more accurately learn of transmission performance of a path based on information carried in the ACK, thereby alleviating low accuracy and measurement inconvenience for calculating the parameters based on an ACK in the conventional technology. When the method and apparatus described in this application are used in a scenario of measuring another transmission parameter, only simple replacement needs to be performed on some parameters mentioned above, and details are not described again in this application. For example, for a scenario in which the transmission parameter is the receiving rate of the receiving node, only the foregoing RTT measurement needs to be replaced with calculation of the receiving rate.

In this way, in a scenario in which there is a relatively small quantity of ACKs or in a scenario in which returning an ACK is delayed, the sending node determines, by using an OWD, an RTT measurement value based on a data packet sending timestamp and information indicating ACK delay duration that are carried in an ACK. When there is a plurality of measurement values, a required statistical value can be obtained. According to the method, dependence of delay estimation on a per-packet ACK mechanism is reduced, and precision of measurement of the minimum RTT is ensured, thereby enabling more precise protocol congestion control that is performed based on the minimum RTT. For example, in a test scenario, an inherent RTT of a network is set to 100 ms, a receiving node returns an ACK packet every 20 ms, and a minimum RTT is calculated by using both the method described in this application and the conventional technology of sampling an RTT on a sending node. A test result shows that a minimum RTT value obtained through estimation by using the existing solution has a deviation of 6% to 18% (a calculation result jitters when sampling is performed at different time points), whereas a minimum RTT obtained through estimation by using the solutions in this application is more precise, and a deviation is within 1%.

In addition, a more accurate minimum RTT may enable more precise protocol congestion control that is performed based on the minimum RTT, thereby improving transmission efficiency. For example, the transmission efficiency is improved, reflected by reduction of a queuing delay and reduction of a redundancy rate. The redundancy rate is also referred to as a retransmission rate, and is used to indicate a ratio of retransmitted data packets to total sent data packets. For example, a BBR algorithm is implemented in an ACK delayed ACK mechanism. Collecting statistics on a minimum RTT in the BBR algorithm is performed by using both the conventional technology and the solutions in this application. Virtual machines in Sydney and Tokyo branches of the Google data center are rent, and data transmission is performed between Sydney and Tokyo. A comparison result is as follows. When the conventional technology is used, an average queuing delay is 63 ms, and a redundancy rate is 1.41%, whereas when this application is used, an average queuing delay is 36 ms, and a redundancy rate is 0.65%. Therefore, compared with the conventional technology, according to this application, the queuing delay can be reduced by 43% and the redundancy rate can be reduced by 54%.

On the other hand, in a delayed ACK scenario in the conventional technology, because one ACK corresponds to a plurality of data packets, the receiving node needs to cache and manage information about each received data packet, for example, a time at which a data packet is received. Instead, when the foregoing method is used, the receiving node needs to cache and manage only information about some received data packets. This reduces occupancy of resources of the receiving node and system overheads, and an obtained RTT statistical value is more precise. In this way, a more precise RTT statistical value is obtained with a relatively small quantity of overheads.

The foregoing method may be further used for monitoring calculation of an RTT. That is, the receiving node prompts, by perceiving jitter in an OWD, the sending node to update calculation of an RTT. The monitoring may be used for a single-path connection or a multi-path connection. If the monitoring is used for a multi-path connection, packets used below should all be transmitted on a same subflow. That is, RTTs are on a same round-trip path. A transport layer transmission protocol is not limited in the following implementation. For example, a TCP, a UDP, an MP protocol, a QUIC protocol, and the like are all applicable. The following uses the UDP protocol as an example for description. In short, the sending node sends, to the receiving node, packets used for estimating an RTT, where the packets may be control packets or data packets, and the packets are also referred to as delay probe packets. The receiving node returns an ACK, where the ACK includes information required for collecting statistics on an RTT for the sending node for calculation, for example, information indicating ACK delay duration and a sending timestamp of a UDP packet corresponding to the ACK. In this way, the sending node can calculate a measurement value or statistical value of the RTT. Different from the foregoing method, the receiving node may estimate the RTT based on an OWD by using the delay probe packets. When jitter in the estimated RTT exceeds a range, the receiving node sends the estimated RTT to the sending node, to prompt the sending node to calculate the measurement value or statistical value of the RTT again.

The following describes an implementation of the foregoing solution in a UDP protocol scenario by using delay measurement as an example.

A process at the first phase is similar to that in the foregoing method. Herein, only a brief description is provided. A sending node sends a first UDP packet to a receiving node, where the first UDP packet is a delay probe packet. The first UDP packet includes a sending timestamp of the first UDP packet. The receiving node returns an ACK to the sending node based on the first UDP packet, where the ACK carries information indicating ACK delay duration and the sending timestamp of the first UDP packet. After receiving the ACK, the sending node calculates an RTT of the first UDP packet based on the ACK delay duration, the sending time stamp, and a moment at which the ACK is received, and the RTT is denoted as $RTT_0$.

After receiving the first UDP packet, the receiving node may estimate an RTT between the sending node and the receiving node based on the first UDP packet. For example, an OWD of the first UDP packet is denoted as $OWD_0$, and $RTT=aOWD_0$, where $1 \leq a \leq 2$. This is based on definitions of an RTT and an OWD, and an RTT is greater than or equal to an OWD. That is, on the one hand, the receiving node estimates the RTT and sends the RTT to the sending node, and the sending node considers the RTT as an RTT measurement value and does not need to calculate the RTT measurement value. On the other hand, after the receiving node estimates the RTT, the sending node still calculates an RTT measurement value, and the RTT estimated by the receiving node is used only for estimating jitter in the RTT.

As time changes, a value of a transmission parameter of a network connection also changes. The change may be referred to as jitter in the value of the transmission parameter. Due to existence of the jitter, it is not accurate enough that the calculated $RTT_0$ is always used as a RTT of a connection. With reference to the foregoing process, after the receiving node estimates the RTT, the sending node still calculates the RTT measurement value, and the RTT estimated by the receiving node is used only for estimating jitter in the RTT. Estimation of the jitter in the RTT is used for notifying the sending node of a time at which calculation of the RTT measurement value is updated. In other words, during specific implementation, when the RTT jitter estimated by the receiving node exceeds a specific threshold, the receiving node triggers, by sending an instruction or information (for example, the receiving node carries a latest evaluated RTT in an ACK and sends the ACK to the sending node), the sending node to update (that is, recalculate or correct) a measurement value or statistical value of the RTT. At a next phase of the solution, the jitter is evaluated based on an OWD of a packet received later, and $RTT_0$ is corrected in this manner.

The second phase includes the following steps.

A: The sending node sends a second UDP packet to the receiving node, where the second UDP packet carries a sending timestamp and the $RTT_0$ obtained in the foregoing step. Viewed from a time sequence of the sending node, the second UDP packet may be the first packet sent by the sending node after the sending node receives the ACK of the first UDP packet, or the second UDP packet may be sent after a segment of time after the sending node receives the ACK of the first UDP packet. During the segment of time, the sending node may have received or sent another packet.

After the $RTT_0$ in the second UDP packet is sent to the receiving node, each subsequently sent UDP packet may carry the $RTT_0$. A carried RTT may be the $RTT_0$, or may be an RTT obtained by the sending node based on an ACK received after the ACK of the first UDP packet. As described above, the $RTT_0$ is a reference value, and the reference value may also be updated. This helps the receiving node more accurately estimate the RTT of the current connection. If these values do not need to be changed within a segment of time, all packets sent by the sending node within the segment of time may not carry the $RTT_0$. In this way, an amount of to-be-transmitted data can be reduced, and network resources can be saved.

B: After receiving the second UDP packet, the receiving node estimates a current RTT based on an OWD of the second UDP packet and the OWD of the first UDP packet.

In an implementation, the receiving node calculates the OWD of the second UDP packet (denoted as $OWD_1$) based on the sending timestamp carried in the second UDP packet and a receiving time that is of the second UDP packet and that is recorded by the receiving node. The receiving node calculates a difference between the OWD of the second UDP packet and the OWD of the first UDP packet (denoted as $OWD_0$), and the difference is denoted as $\Delta OWD_0$. Further, an RTT of the second UDP packet (denoted as $RTT_1$) is estimated, and $RTT1=RTT_0+b\Delta OWD_0$, where $1 \leq b \leq 2$. In addition, the RTT of the connection between the sending node and the receiving node in this case is estimated as follows: $RTT=c \times RTT_1+(1-c) \times RTT_0$, where $0 \leq c \leq 1$. In this way, the estimated RTT is more accurate. A change in the RTT may also be estimated on the receiving node in this manner.

In a process of transmitting data on a connection, steps A and B may be performed for a plurality of times. The following uses an example for description in which the receiving node receives an $i^{th}$ UDP packet, where i is greater than 2. The $i^{th}$ UDP packet is a packet sent by the sending node after the second UDP packet is sent, and is also the $i^{th}$ UDP packet received by the receiving node after the second UDP packet is received. An OWD of the $i^{th}$ UDP packet is denoted as $OWD_{i-1}$. The receiving node calculates a difference between the OWD of the $i^{th}$ UDP packet and an OWD of an $(i-1)^{th}$ UDP packet (denoted as $OWD_{i-2}$), and the difference is denoted as $\Delta OWD_{i-1}$. Further, an RTT of the $(i-1)^{th}$ UDP packet (denoted as $RTT_{i-1}$) is estimated, and $RTT_{i-1}=RTT_{i-2}+b\Delta OWD_0$, where $1\le b\le 2$. It should be noted that $RTT_{i-2}$ may be equal to any value from $RTT_0$ to $RTT_{i-2}$. That is, $RTT_{i-2}$ functions as a base, and an RTT used as a base does not change. The receiving node calculates $\Delta OWD_{i-1}$ ($\Delta OWD_{i-1}=OWD_{i-1}-OWD_{i-2}$), and estimates $RTT_{i+1}$ ($RTT_{i+1}=RTT_{i+2}+2\Delta OWD_i$). $RTT=a\times RTT_{i+1}+(1-a)\times RTT_i$.

In this way, the receiving node can monitor jitter in the RTT by estimating the RTT. When a change in an estimated RTT is greater than a threshold, the receiving node may notify the sending node of re-measurement. In this way, a measurement value or statistical value of the RTT does not need to be calculated at all times, processing resources of the sending node can be saved, the sending node can also update the RTT with an actual change in the network, to meet a real-time requirement and ensure accuracy, and transmission performance of the path can be more accurately reflected.

Different from an objective of the previously described method that is to obtain a more accurate measurement value or statistical value of the RTT, in the foregoing embodiment in which the UDP is used as an example, the receiving node monitors a change in a transmission status, and activates, based on a requirement, the sending node to update a measurement value or statistical value of the RTT. Further, a change in an RTT is inferred by collecting statistics on a change in an OWD on the receiving node, thereby reducing dependence of delay estimation on a quantity of ACKs, reducing unnecessary ACK packets, and reducing transmission overheads. In addition, statistics collected on the change in the OWD on the receiving node can directly reflect a transmission status of a forward path, thereby eliminating interference caused by jitter on a backward path during ACK transmission on the backward path, so that a delay change estimate more truly reflects the transmission status of the forward path, and transmission control can be more accurate.

An embodiment of this application further provides an RTT evaluation system. The system includes a first device and a second device, and may perform the methods described above. In an implementation, the first device corresponds to the sending node described above. The first device is configured to send a plurality of packets to the second device on a same path, where each of the plurality of packets carries a timestamp indicating a sending time of the packet. The second device is configured to determine, by calculating a statistical value of OWDs of the plurality of packets, a first timestamp in timestamps carried in the plurality of packets, where the first timestamp indicates a sending time of a first packet in the plurality of packets, and a measurement value of an OWD of the first packet is equal to the statistical value of the OWDs of the plurality of packets. The second device is configured to send an ACK to the first device, where the ACK includes the first timestamp and ACK time information, and the ACK time information is related to duration from a time at which the second device receives the first packet to a time at which the second device sends the ACK. The first device is configured to receive the ACK, and determine a measurement value of an RTT of the path based on the first timestamp, the ACK time information, and a second timestamp, where the second timestamp indicates a time at which the first device receives the ACK.

Because the packet sent by the first device carries a timestamp indicating the sending time of the packet, the second device can calculate the OWD of the path. Because the second device may return the ACK after receiving a plurality of packets, the second device determines, by using the statistical value of the OWDs, a timestamp indicating a sending time of a packet carried in the ACK, and also carries, in the ACK, information that corresponds to the packet and that can indicate an ACK sending delay. That is, an RTT is evaluated by analyzing an OWD. In this way, accuracy of RTT evaluation can be improved through cooperation between the first device and the second device. Controlling data transmission on the path based on an RTT that is more accurate and that can more truly reflect an actual network condition can improve transmission performance of the path.

For various implementation details of the system, refer to the foregoing description of the method. Details are not described herein again.

Figure 5:
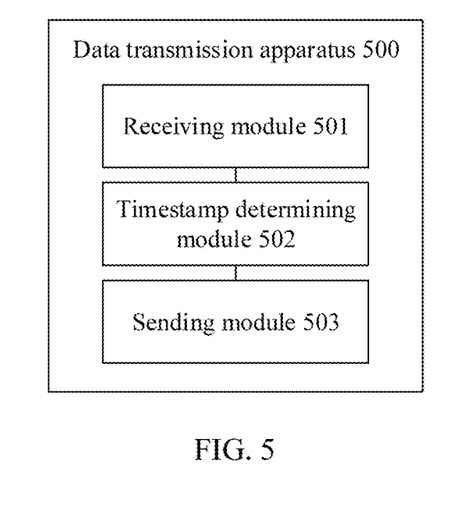
FIG. 5 is a schematic structural diagram of a data transmission apparatus (corresponding to a receiving node) according to an embodiment of this application.

An embodiment of this application further provides a data transmission apparatus. The apparatus corresponds to the receiving node described above, that is, corresponds to the foregoing second device or the second node, and may cooperate with the sending node (that is, the foregoing first device or the foregoing first node), to perform the RTT evaluation method described in this application. The apparatus may be a device, a processor in a device, a chip, or a chip system. The following describes the apparatus with reference to FIG. 5. The data transmission apparatus 500 includes a receiving module 501, configured to receive a plurality of packets from a first device on a same path, where each of the plurality of packets carries a timestamp indicating a sending time of the packet, a timestamp determining module 502, configured to determine, by calculating a statistical value of OWDs of the plurality of packets, a first timestamp in timestamps carried in the plurality of packets, where the first timestamp indicates a sending time of a first packet in the plurality of packets, and a measurement value of an OWD of the first packet is equal to the statistical value of the OWDs of the plurality of packets, and a sending module 503, configured to send an ACK to the first device, so that the first device evaluates an RTT of the path based on the ACK, where the ACK includes the first timestamp and ACK time information, and the ACK time information is related to duration from a time at which the second device receives the first packet to a time at which the second device sends the ACK.

The data transmission apparatus 500 is also the receiving node in the system corresponding to FIG. 2. In other words, there may be a plurality of implementations for an internal structure of the receiving node, and only several implementations are listed as examples in this application, provided that the receiving node can perform the methods described above. For example, it may be considered that the data packet parsing module 205, the OWD estimation module 206, and the ACK construction module 207 that are on the receiving node in FIG. 2 correspond to the timestamp determining module 502 in FIG. 5. For another implementation, a function, and achievable technical effects that are of the data transmission apparatus 500, refer to related descriptions in the foregoing method part. Details are not described herein again.

It should be understood that in the embodiments of this application, division into modules is an example and is merely logical function division. In actual implementation, another division manner may be used. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 6:
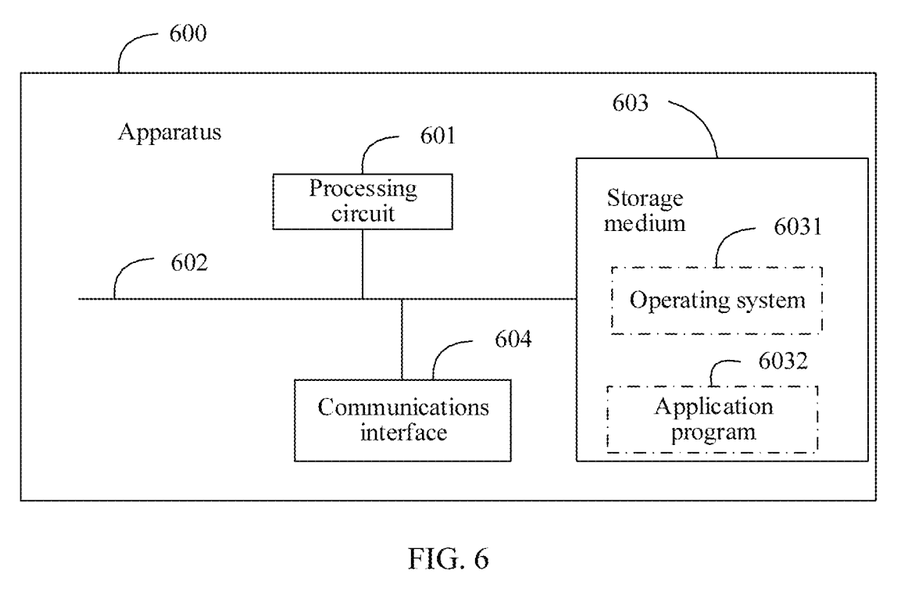
FIG. 6 is a schematic structural diagram of a data transmission apparatus (corresponding to a receiving node) according to an embodiment of this application.

Based on a same concept, FIG. 6 shows an apparatus 600 according to this application. The apparatus 600 may include a processing circuit 601, and the apparatus 600 may further include at least one storage medium 603, configured to store a program instruction and/or data. The storage medium 603 is coupled to the processing circuit 601. Coupling in this embodiment of this application is an indirect coupling or a communication connection between apparatuses, units, or modules, may be in an electrical form, a mechanical form, or another form, and is used for information exchange between the apparatuses, the units, or the modules. The processing circuit 601 may cooperate with the storage medium 603. The processing circuit 601 may execute the program instruction stored in the storage medium 603. Optionally, at least a part of the storage medium 603 may be included in the processing circuit 601.

The apparatus 600 may further include a communications interface 604, and the apparatus 600 may exchange information with another device through the communications interface 604. The communications interface 604 may be a circuit, a bus, a transceiver, an antenna, or any other apparatus that may be configured for information exchange.

In a possible implementation, the apparatus 600 may be used by a receiving node, and may be an apparatus that can support the receiving node in implementing a function of the receiving node according to any one of the foregoing embodiments. The storage medium 603 stores a necessary computer program instruction and/or data for implementing the function of the receiving node according to any one of the foregoing embodiments. The processing circuit 601 may execute the computer program instruction stored in the storage medium 603, to complete the method performed by the receiving node according to any one of the foregoing embodiments. When the apparatus 600 is used by the receiving node, functions of the receiving module 501, the timestamp determining module 502, and the sending module 503 shown in FIG. 5 may all be implemented by the processing circuit 601. In addition, functions of the data packet parsing module 205, the OWD estimation module 206, the ACK construction module 207, and the ACK sending module 208 shown in FIG. 2 may also be implemented by the processing circuit 601.

A specific connection medium between and a connection manner of the communications interface 604, the processing circuit 601, and the storage medium 603 are not limited in this embodiment of this application. For example, electrical connection may be used. FIG. 6 shows a manner of connecting the foregoing components through a bus 602. This is merely an example for description, and is not limited thereto. The bus may be classified into an address bus, a data bus, a control bus, and the like. For ease of representation, only one thick line is used to represent the bus in FIG. 6, but this does not mean that there is only one bus or only one type of bus.

In this embodiment of this application, the processing circuit 601 may be a general-purpose processor, a digital signal processor, an application-specific integrated circuit, a field programmable gate array or another programmable logic device, a discrete gate or transistor logic device, or a discrete hardware component, and may implement or perform the methods and logical block diagrams disclosed in the embodiments of this application. The general-purpose processor may be a microprocessor or any conventional processor, or the like. The method disclosed with reference to the embodiments of this application may be directly performed by a hardware processor, or may be performed by using a combination of hardware and a software module in the processor.

In this embodiment of this application, the storage medium 603 may be a nonvolatile memory, such as a hard disk drive (HDD) or a solid-state drive (SSD), or may be a volatile memory, such as a random-access memory (RAM). The storage medium 603 may further be any other medium capable of carrying or storing expected program code in a form of an instruction or a data structure and capable of being accessed by a computer, but is not limited thereto. The memory in the embodiments of this application may alternatively be a circuit or any other apparatus that can implement a storage function, and is configured to store a program instruction and/or data.

This application further provides a chip. The chip may include a communications interface and a processing circuit. The processing circuit is configured to control the communications interface to implement the method described above. It should be understood that the chip may be run on a device. The device includes a storage medium. The storage medium may store an instruction or code for performing the method described above. In this way, after the chip is powered on, the processing circuit may invoke the instruction or code in the storage medium in the device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD) read-only memory (ROM) (CD-ROM), an optical memory, and the like) that include computer-usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

The computer program instructions may be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may also be loaded onto a computer or another programmable data processing device, so that the method described above is performed on the computer or the other programmable data processing device.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A round-trip time (RTT) evaluation system comprising:
   a first network device comprising a first transmitter configured to send, on a first path, a plurality of first packets comprising first timestamps, wherein each packet of the first packets carries a respective timestamp of the first timestamps that indicates a sending time of the packet; and
   a second network device communicatively coupled to the first network device and comprising:
      a first receiver configured to receive the first packets;
      one or more first processors configured to:
         calculate first one-way delays (OWDs) of the first packets;
         determine a minimum OWD of the first OWDs;
         select a second timestamp of the first timestamps that corresponds to a second packet of the first packets that corresponds to the minimum OWD; and
         determine, based on the first OWDs, a first measurement value of a second OWD of the second packet, wherein the first measurement value is equal to a first statistical value of the first OWDs; and
      a second transmitter configured to send, to the first network device, an acknowledgement (ACK) comprising the second timestamp and ACK time information, wherein the ACK time information corresponds to a duration from a first time when the second network device receives the second packet to a second time when the second network device sends the ACK, wherein the ACK time information comprises a fourth timestamp and a fifth timestamp, wherein the fourth timestamp indicates the first time, wherein the fifth timestamp indicates the second time, and
   wherein the first network device further comprises:
      a second receiver configured to receive the ACK; and
      one or more second processors configured to determine a second measurement value of an RTT of the first path based on the second times tamp, the ACK time information, and a third timestamp indicating a third time when the first network device receives the ACK, wherein determining the second measurement value comprises subtracting both the second timestamp and a difference between the fifth timestamp and the fourth timestamp from the third time to obtain the second measurement value.

2. The RTT evaluation system of claim 1, wherein the ACK time information comprises a first time segment indicating the duration.

3. The RTT evaluation system of claim 2, wherein the one or more second processors are further configured to subtract both the sending time and the first time segment from the third time to obtain the second measurement value.

4. The RTT evaluation system of claim 1, wherein the one or more second processors are further configured to:
   calculate, based on a plurality of ACKs collected within a first time window, a plurality of third measurement values of the RTT; and
   calculate a second statistical value corresponding to the third measurement values.

5. The RTT evaluation system of claim 4, wherein the first statistical value and the second statistical value are of a common type, and wherein the common type is one of a maximum value, a minimum value, or an average value.

6. The RTT evaluation system of claim 4, wherein the first statistical value is a minimum OWD in the first OWDs, and wherein the second statistical value is a minimum RTT in the third measurement values.

7. A round-trip time (RTT) evaluation method, comprising:
   sending, by a first network device on a first path, a plurality of first packets comprising first timestamps, wherein each packet of the first packets carries a respective timestamp of the first timestamps that indicates a sending time of the packet;
   receiving, by a second network device, the first packets;
   calculating, by the second network device, first one-way delays (OWDs) of the first packets;
   determining, by the second network device, a minimum OWD of the first OWDs;
   selecting, by the second network device, a second times tamp of the first times tamps that corresponds to a second packet of the first packets that corresponds to the minimum OWD;
   determining, by the second network device based on the first OWDs, a first measurement value of a second OWD of the second packet, wherein the first measurement value is equal to a first statistical value of the first OWDs;
   sending, by the second network device, an acknowledgement (ACK) comprising the second timestamp and ACK time information, wherein the ACK time information corresponds to a duration from a first time when the second network device receives the second packet to a second time when the second network device sends the ACK, wherein the ACK time information comprises a fourth timestamp and a fifth timestamp, wherein the fourth timestamp indicates the first time, wherein the fifth timestamp indicates the second time;
   receiving, by the first network device, the ACK; and
   determining, by the first network device, a second measurement value of an RTT of the first path based on the second timestamp, the ACK time information, and a third timestamp indicating a third time when the first network device receives the ACK, wherein the determining the second measurement value comprises subtracting both the second timestamp and a difference between the fifth timestamp and the fourth timestamp from the third time to obtain the second measurement value.

8. The RTT evaluation method of claim 7, wherein the ACK time information comprises a first time segment indicating the duration.

9. The RTT evaluation method of claim 8, further comprising subtracting, by the first network device, both the sending time and the first time segment from the third time to obtain the second measurement value.

10. The RTT evaluation method of claim 7, further comprising:
calculating, by the first network device based on a plurality of ACKs collected within a first time window, a plurality of third measurement values of the RTT; and
calculating, by the first network device, a second statistical value corresponding to the third measurement values.

11. The RTT evaluation method of claim 10, wherein the first statistical value and the second statistical value are of a common type, and wherein the common type is one of a maximum value, a minimum value, or an average value.

12. The RTT evaluation method of claim 10, wherein the first statistical value is a minimum OWD in the first OWDs, and wherein the second statistical value is a minimum RTT in the third measurement values.

13. A computer program product comprising computer-executable instructions that are stored on a non-transitory computer-readable storage medium and that, when executed by a processor of a round-trip time (RTT) evaluation system, causes the RTT evaluation system to be configured to:
send, by a first network device on a first path, a plurality of first packets comprising first timestamps, wherein each packet of the first packets carries a respective timestamp of the first timestamps that indicates a sending time of the packet;
receive, by a second network device, the first packets;
calculate, by the second network device, first one-way delays (OWDs) of the first packets;
determine, by the second network device, a minimum OWD of the first OWDs;
select, by the second network device, a second timestamp of the first timestamps that corresponds to a second packet of the first packets that corresponds to the minimum OWD;
determine, by the second network device based on the first OWDs, a first measurement value of a second OWD of the second packet, wherein the first measurement value is equal to a first statistical value of the first OWDs;
send, by the second network device, an acknowledgement (ACK) comprising the second timestamp and ACK time information, wherein the ACK time information corresponds to a duration from a first time when the second network device receives the second packet to a second time when the second network device sends the ACK, wherein the ACK time information comprises a fourth timestamp and a fifth timestamp, wherein the fourth timestamp indicates the first time, wherein the fifth timestamp indicates the second time;
receive, by the first network device, the ACK; and
determine, by the first network device, a second measurement value of an RTT of the first path based on the second timestamp, the ACK time information, and a third timestamp indicating a third time when the first network device receives the ACK, wherein the determining the second measurement value comprises subtracting both the second timestamp and a difference between the fifth timestamp and the fourth timestamp from the third time to obtain the second measurement value.

14. The computer program product of claim 13, wherein the ACK time information comprises a first time segment indicating the duration.

15. The computer program product of claim 14, wherein the RTT evaluation system is further configured to subtract both the sending time and the first time segment from the third time to obtain the second measurement value.

16. The computer program product of claim 13, wherein the RTT evaluation system is further configured to:
calculate, based on a plurality of ACKs collected within a first time window, a plurality of third measurement values of the RTT; and
calculate a second statistical value corresponding to the third measurement values.

17. The computer program product of claim 16, wherein the first statistical value and the second statistical value are of a common type, and wherein the common type is one of a maximum value, a minimum value, or an average value.

18. The computer program product of claim 16, wherein the first statistical value is a minimum OWD in the first OWDs, and wherein the second statistical value is a minimum RTT in the third measurement values.

* * * * *

UNITED STATES PATENT AND TRADEMARK OFFICE
CERTIFICATE OF CORRECTION

PATENT NO. : 11,611,498 B2
APPLICATION NO. : 17/199773
DATED : March 21, 2023
INVENTOR(S) : Tong Li et al.

It is certified that error appears in the above-identified patent and that said Letters Patent is hereby corrected as shown below:

In the Claims

Claim 1, Column 25, Line 63: "second times tamp, the" should read "second timestamp, the"

Claim 7, Column 26, Lines 41 and 42: "second times tamp of" should read "second time-stamp of"

Claim 7, Column 26, Line 42: "first times tamps that" should read "first timestamps that"

Signed and Sealed this
Twenty-third Day of May, 2023

Katherine Kelly Vidal
*Director of the United States Patent and Trademark Office*